United States Patent

Nakagawa et al.

[11] Patent Number: 5,854,366
[45] Date of Patent: Dec. 29, 1998

[54] STYRENE BASE RANDOM COPOLYMER AND PROCESS FOR PRODUCING THE SAME

[75] Inventors: Satoshi Nakagawa, Sodegaura; Shuji Yoshimi; Hayato Kihara, both of Ichihara, all of Japan

[73] Assignee: Sumitomo Chemical Company, Limited, Osaka, Japan

[21] Appl. No.: 744,143

[22] Filed: Nov. 12, 1996

[30] Foreign Application Priority Data

Nov. 10, 1995 [JP] Japan .................................. 7-292740

[51] Int. Cl.⁶ ...................... C08F 212/36; C08F 212/08
[52] U.S. Cl. .................... 526/336; 526/347; 528/481; 528/501
[58] Field of Search ...................... 526/336, 347, 526/88; 528/481, 501

[56] References Cited

U.S. PATENT DOCUMENTS

| | | | |
|---|---|---|---|
| 4,336,361 | 6/1982 | Tsuruta et al. | 526/336 X |
| 5,059,667 | 10/1991 | Nakamura | 526/336 X |
| 5,318,852 | 6/1994 | Nishimori et al. | 526/336 X |
| 5,459,210 | 10/1995 | Kihara et al. | 526/336 X |

FOREIGN PATENT DOCUMENTS

| | | |
|---|---|---|
| 0311099 | 4/1989 | European Pat. Off. . |
| 2170806 | 7/1990 | Japan . |
| 2182711 | 7/1990 | Japan . |
| 515730 | 3/1993 | Japan . |
| 499969 | 2/1939 | United Kingdom . |
| 2131034 | 6/1984 | United Kingdom . |
| 2275474 | 8/1994 | United Kingdom . |

*Primary Examiner*—Fred Teskin
*Attorney, Agent, or Firm*—Stevens, Davis, Miller & Mosher, L.L.P.

[57] ABSTRACT

A styrene base random copolymer having a weight average molecular weight of 200,000 to 1,000,000, a monovinylbenzene unit and a divinylbenzene unit in an amount of 50 to 500 ppm by weight based on the weight of the monovinylbenzene unit, the divinylbenzene unit consisting of p-divinylbenzene unit and m-divinylbenzene unit, wherein the weight ratio between the p-divinylbenzene unit and the m-divinylbenzene unit is in the range of 100:0 to 75:25, which is superior in impact strength, melt tension, heat resistance and fluidity, and which is capable of being molded within a short molding cycle, is industrially advantageously produced by a continuous bulk polymerization without troubles such as undesirable deposits of polymeric gel material on reactor walls.

9 Claims, No Drawings

STYRENE BASE RANDOM COPOLYMER AND PROCESS FOR PRODUCING THE SAME

The present invention relates to a styrene base random copolymer and a process for producing the same. More specifically, the invention relates to a styrene base random copolymer superior in impact strength, fluidity, melt tension, heat resistance and appearance of molded articles, and an industrially advantageous process for producing the same.

Styrene base polymers have been used extensively for injection molding, extrusion foaming or the like, because of high rigidity, superior dimensional stability and low prices.

However, particularly for use in injection molding, the polymers are now required to have a higher molecular weight so that the impact strength can be improved. Nevertheless, the polymers have a problem such that the molecular weight can be increased with deterioration of the fluidity.

As known, the fluidity can be improved by decreasing the molecular weight or by adding plasticizers such as mineral oil to the polymers. However, the addition of plasticizers results in deterioration of the heat resistance.

For use in injection molding, it is also required to shorten molding cycle. Therefore, the polymers are required to exhibit superior fluidity at an injection stage and also exhibit a high solidification temperature, namely superior heat resistance, at a cooling stage.

In order to improve the heat resistance and the impact strength while avoiding the deterioration of fluidity, it is proposed to broaden a molecular weight distribution or polydispersity of polymers.

For example, Japanese Patent Publication Nos. 57-30843 and 62-61231 propose the production of resin compositions having wide molecular weight distributions by blending a high molecular weight polystyrene and a low molecular weight polystyrene, and by applying a multi-stage polymerization, respectively. However, these are expensive and complicated in the process, and therefore they are not advantageous from an industrial point of view.

Japanese Patent Kokai (laid-open) Nos. 2-170806 and 2-182711 disclose processes of broadening the molecular weight distributions, wherein the polymerization of styrene or styrene compounds is performed in the presence of a polyfunctional vinyl compound such as divinylbenzenes.

However, particularly in carrying out the said process using a kind of divinylbenzene as the polyfunctional vinyl compound according to a so-called continuous bulk polymerization, wherein the divinylbenzene is continuously fed into a reaction system with styrene or a styrene compound, undesirable polymeric gel materials tend to deposit on heating coils, reactor walls or the like, because large amounts of divinylbenzene are easily left unreacted in the reaction system. Moreover, the unreacted divinylbenzene easily remains in a recovered volatile material, which is reused repeatedly as a so-called recycled solvent, so that gellation easily occurs to make the successive continuous operation difficult, when the recycled solvent is left stands for a long period of time.

An object of the present invention is to provide a styrene base random copolymer which is superior in impact strength, melt tension and fluidity while maintaining high heat resistance, and which is therefore capable of being molded within a short molding cycle.

Another object of the present invention is to provide a process for producing the said random copolymer, according to which the molecular weight can be controlled easily.

Still another object of the present invention is to provide an industrially advantageous process for producing the said random copolymer while avoiding undesirable deposits of polymeric gel material on reactor walls or the like, even when the process is carried out by continuous bulk polymerization.

Other objects and advantages of the present invention will be apparent from the ensuing description and appended claims.

The present invention provides a styrene base random copolymer having a weight average molecular weight of 200,000 to 1,000,000, a monovinylbenzene unit, and a divinylbenzene unit in an amount of 50 to 500 ppm by weight based on the weight of the monovinylbenzene unit, the divinylbenzene unit consisting of p-divinylbenzene unit and m-divinylbenzene unit, wherein the weight ratio between the p-divinylbenzene unit and the m-divinylbenzene unit is in the range of 100:0 to 75:25.

The present invention also provides a process for producing a styrene base random copolymer, which comprises subjecting a monomer mixture comprising a monovinylbenzene and a divinylbenzene to polymerization, the monomer mixture comprising the divinylbenzene in an amount of 50 to 500 ppm by weight based on the weight of the monovinylbenzene, the divinylbenzene consisting of p-divinylbenzene and m-divinylbenzene, wherein the weight ratio between the p-divinylbenzene and the m-divinylbenzene is in the range of 100:0 to 75:25.

The present invention further provides a process for producing a styrene base random copolymer by means of continuous bulk polymerization, which comprises continuously feeding a monomer mixture comprising a monovinylbenzene and a divinylbenzene to a polymerization reaction zone, the monomer mixture comprising the divinylbenzene in an amount of 50 to 500 ppm by weight based on the weight of the monovinylbenzene, the divinylbenzene consisting of p-divinylbenzene and m-divinylbenzene, wherein the weight ratio between the p-divinylbenzene and the m-divinylbenzene is in the range of 100:0 to 75:25, performing the polymerization reaction at a temperature of 140° to 200° C. to a final conversion of 60% by weight or more, and passing the resulting polymerization reaction mixture through a deaerating zone under a reduced pressure at a temperature of 200° to 280° C. to recover the remaining unreacted monomer or monomers.

The present invention is illustrated in detail as follows.

The styrene base random copolymers in accordance with the present invention have a weight average molecular weight of 200,000 to 1,000,000, preferably 200,000 to 600,000.

The random copolymers of the present invention also have a monovinylbenzene unit and a divinylbenzene unit, wherein the amount of the divinylbenzene unit ranges from 50 to 500 ppm by weight, preferably from 50 to 300 ppm by weight, based on the weight of the monovinylbenzene unit.

The content of the divinylbenzene unit can be determined by a thermal decomposition gas chromatography.

Random copolymers having too small amount of the divinylbenzene unit are inferior in the impact strength and melt tension. On the other hand, those having too large amount thereof are inferior in the fluidity.

Random copolymers too low in the weight average molecular weight are inferior in the impact strength and melt tension, and on the other hand, those too high are inferior in the fluidity.

The divinylbenzene unit consists of p-divinylbenzene unit and m-divinylbenzene unit, wherein the weight ratio between the p-divinylbenzene unit and the m-divinylbenzene unit is in the range of 100:0 to 75:25, preferably 100:0 to 95:5.

In the present invention, more preferably are random copolymers having the divinylbenzene unit consisting of p-divinylbenzene unit and m-divinylbenzene unit, wherein the weight ratio between the p-divinylbenzene unit and the m-divinylbenzene unit is in the range of 100:0 exclusive to 95:5 inclusive.

In carrying out the process of the present invention, the monovinylbenzene to be used includes, for example, styrene, α-alkyl-substituted styrenes such as α-methylstyrene and nuclear alkyl-substituted styrenes such as p-methylstyrene.

In addition thereto, a compound copolymerizable with the monovinylbenzene can be used. Examples thereof are acrylonitrile, methacrylonitrile, methacrylic acid, esters thereof such as methyl methacrylate, maleic anhydride, maleimide, nuclear substituted maleimides such as phenylmaleimide and the like.

The divinylbenzene to be used consists of p-divinylbenzene and m-divinylbenzene, wherein the weight ratio between the p-divinylbenzene and the m-divinylbenzene is in the range of 100:0 to 75:25, preferably 100:0 to 95:5. More preferable are mixtures of p-divinylbenzene and m-divinylbenzene wherein the weight ratio between the p-divinylbenzene and the m-divinylbenzene is in the range of 100:0 exclusive to 95:5 inclusive.

In the present invention, those having a too small amount of p-isomer are not desirable from a view point of continuous production, because undesirable polymeric gel materials are easily formed particularly when the reaction is carried out by continuous bulk polymerization.

The monomer mixture to be used comprises the divinylbenzene in an amount of from 50 to 500 ppm by weight, preferably 50 to 300 ppm by weight, based on the weight of the monovinylbenzene. When the amount of divinylbenzene is too large, a solubility of the divinylbenzene in the monovinylbenzene is lowered and cross-linking gellation easily occurs.

The polymerization method can be any methods, and includes, for example, a thermal polymerization and a polymerization using a polymerization initiator. These polymerizations are carried out preferably by a continuous bulk polymerization.

In carrying out the continuous bulk polymerization, the monovinylbenzene and the divinylbenzene are uniformly mixed, and the resulting monomer mixture is continuously fed into a polymerization reaction zone.

The polymerization reaction is performed at a temperature of 140° to 200° C., and continued to a final conversion of usually 60% by weight or more, preferably 70% by weight or more.

After the polymerization reaction is over, the reaction mixture is preferably led to a pre-heating zone kept at a temperature of 200° to 280° C. and then passed through a deaerating zone under a reduced pressure at that temperature, whereby the remaining monomer or monomers can be recovered and reused, while obtaining the desired random copolymers.

A reactor to be used for polymerization can be any reactors and includes a completely mixing type agitating polymerization vessel, a plug flow type flooded polymerization vessel, a static mixer tube type polymerization vessel and a combination thereof.

In carrying out the polymerization using a polymerization initiator, the manner is not particularly limited. For example, the polymerization can be carried out in a continuous manner or a batchwise manner, and the initiator can be added into a reaction system with the monomer mixture at a stroke or dividedly. Alternatively, the initiator can be continuously fed into the reaction system independently with the monomer mixture.

According to the process described above, the above-defined random copolymer can be produced industrially advantageously.

The random copolymer of the present invention may be produced in a form of HIPS type, so that the impact strength can be further improved. The HIPS type copolymer can be obtained, for example, by dissolving a rubber material such as polybutadiene in the starting monomer mixture, followed by the polymerization reaction, or by mixing the rubber material with the resulting random copolymer immediately after the polymerization reaction.

Examples of the rubber materials are diene rubbers such as polybutadiene, acrylonitrile-butadiene copolymer rubber and styrene-butadiene copolymer rubber, polybutylacrylate, ethylene-propylene-diene ternary copolymer rubber and the like.

If desired, the random copolymer in accordance with the present invention may contain a lubricant, an antistatic agent, an antiflaming agent, a heat stabilizer, an ultraviolet absorbent, a pigment, a dye or the like. Further, a plasticizer such as mineral oil may be added as far as the effect of the present invention is not damaged.

In accordance with the present invention, the random copolymers well-balanced in impact strength and fluidity, and superior in melt tension and moreover capable of giving a molded article of good appearance without formation of undesirable cross-linking gel materials on molding can be obtained industrially advantageously with neither deterioration of heat resistance nor occurrence of cross-linking gellation on the production process.

The random copolymers of the present invention can be effectively used for the production of extrusion molded articles such as films, sheets and foam products, and injection molded articles such as plastic vessels and electric goods of domestic use.

The present invention is illustrated in more detail with reference to the following Examples and Comparative Examples, which are only illustrative and not limitative. In these Examples, % and ppm are by weight unless otherwise specified.

The measuring methods used in Examples and Comparative Examples are as follows.

(1) Weight average molecular weight (Mw), and number average molecular weight (Mn):

The measurement was conducted using a gel permeation chromatography (GPC) equipped with a differential refractometer as a detector manufactured and sold by Nippon Bunko Industries, Ltd. in Japan.

(2) Melt flow rate (MFR); Fluidity:

The average of three measurements carried out according to JIS K 7210 at a resin temperature of 200° C. under a load of 5 kg was taken as a melt flow rate.

(3) Impact strength by falling ball impact test:

50% Failure height was measured according to JIS K 7211, except that a weight of the ball was 28.2 g, and the resulting copolymer were press-molded at 200° C. to prepare the test piece of 50 mm×50 mm in dimensions and 2 mm in thickness.

Higher the value, higher the impact strength.

(4) Melt tension:

Measurement was conducted at 200° C. at an extrusion speed of 20 mm/min. and a rolling speed of 50 r.p.m.

using a melt tension tester manufactured and sold by Toyo Seiki Co., Ltd. in Japan.

(5) Vicat softening point; Heat resistance:

Measurement was conducted according to JIS K 7206 under a load of 5 Kg.

(6) Divinylbenzene content in recovered volatile material (recycled solvent):

Measurement was conducted using a gas chromatography equipped with a capillary column manufactured and sold by Shimadzu Corporation in Japan.

(7) Final conversion:

About 0.1 g of test sample (polymerization reaction mixture) taken out of the pipe line connecting the polymerization reaction vessel with the pre-heating vessel was precisely weighed, and vacuum-dried at 80° C. for 1 hour and at 150° C. for 2 hours. A percentage value of the number obtained by dividing a weight of the sample after the drying by that before the drying was taken as the final conversion.

EXAMPLES 1 and 2

A mixture of ethylbenzene, styrene and p-divinylbenzene (manufactured and sold by Nippon Steel Chemical Co., Ltd. in Japan, 30% diluted product by toluene, m-divinylbenzene content; about 2%) in amounts as shown in the following Table was fed continuously into a continuous bulk polymerization reaction vessel, and the polymerization reaction was performed under conditions as shown also in the following Table.

The reaction mixture obtained was led to a pre-heating vessel of 240° C. and then passed through a deaerating vessel at 280° C. to recover a volatile material comprising the unreacted monomer(s). The copolymer was obtained in a pellet form. The polymerization was continued for a week and the results were as shown in the following Table.

Comparative Example 1

Example 1 was repeated, except that no p-divinylbenzene was used.

Comparative Examples 2 and 3

Example 1 was repeated, except that the p-divinylbenzene used in Example 1 was replaced by a m-isomer rich divinylbenzene (manufactured and sold by Sankyo Kasei Co., Ltd. in Japan, 55% purity, m-isomer:p-isomer=7:3).

Results of Comparative Examples 1 to 3 were as shown also in the following Table.

TABLE

|  | Example | | Comparative Example | | |
| --- | --- | --- | --- | --- | --- |
|  | 1 | 2 | 1 | 2 | 3 |
| Styrene (%) | 95 | 95 | 95 | 95 | 95 |
| p-Divinylbenzene (ppm)[*1] | 105 | 170 | 0 | 0 | 0 |
| m-Rich divinylbenzene (ppm)[*2] | 0 | 0 | 0 | 110 | 220 |
| Ethylbenzene (%) | 5 | 5 | 5 | 5 | 5 |
| Polymerization Temperature (°C.) | 140 | 145 | 140 | 140 | 145 |
| Final Conversion (%) | 70 | 70 | 70 | 70 | 70 |
| Weight Average Molecular Weight (×10$^4$) | 37.0 | 37.8 | 29.0 | 36.6 | 39.0 |
| Polydispersity (Mw/Mn) | 2.5 | 3.0 | 2.1 | 2.4 | 3.0 |
| MFR (g/10 min.) | 2.1 | 2.7 | 2.4 | 2.2 | 2.0 |
| Impact Strength by Falling Ball Impact Test (cm) | 46 | 48 | 39 | 45 | 48 |
| Melt Tension (g) | 26 | 32 | 14 | 24 | 36 |
| Vicat Softening Point (°C.) | 102 | 102 | 102 | 102 | 102 |
| Divinylbenzene content in recovered volatile material (ppm) | | | | | |
| m-Divinylbenzene | <1 | <1 | 0 | 40 | 83 |
| p-Divinylbenzene | 6 | 13 | 0 | 3 | 6 |

Note:
[*1]Numerals in Table: 100% converted value of p-divinylbenzene
[*2]Numerals in Table: 100% converted value of m- and p-divinylbenzenes The results shown in the above Table demonstrate:

That the random copolymers obtained in Examples 1 and 2 which are within the scope of the present invention are well-balanced in fluidity and impact strength and superior in melt tension, while maintaining a high heat resistance, and That the copolymer obtained in Comparative Example 1, wherein no p-divinylbenzene is used, is superior in fluidity but in impact strength and melt tension, and according to Comparative Examples 2 and 3, wherein m-isomer rich divinylbenzene is used in place of p-divinylbenzene, the divinylbenzene content in the recovered volatile material is very high.

According to the test additionally conducted, wherein the volatile materials recovered in the above Comparative Examples 2 and 3 were allowed to stand at about 40° C. in a thermostat, and observed with a lapse of time, one month thereafter, there was observed a production of a material unsoluble in a 10:1 mixed solvent of methyl ethyl ketone and methanol. Moreover, immediately after the above Comparative Example 3, there was observed deposits of unsoluble polymeric materials within a pipe line connected to an outlet of the polymerization reaction vessel.

We claim:

1. A process for producing a styrene based random copolymer by continuous bulk polymerization, which process comprises subjecting a monomer mixture comprising a monovinylbenzene and a divinylbenzene to continuous bulk polymerization, the monomer mixture comprising the divinylbenzene being present in an amount of 50 to 500 ppm by weight based on the weight of the monovinylbenzene, the divinylbenzene consisting of p-divinylbenzene and m-divinylbenzene, wherein the weight ratio between the p-divinylbenzene and the m-divinylbenzene is in the range of 100:0 to 75:25.

2. A process according to claim 1, wherein the monomer mixture is fed continuously to a polymerization reaction zone.

3. A process according to claim 1, wherein the polymerization is performed at a temperature of 140° to 200° C.

4. A process according to claim 1, wherein the polymerization is continued to a final conversion of 60% by weight or more.

5. A process according to claim 4, wherein a reaction mixture of a final conversion of 60% or more is passed through a deaerating zone under a decreased pressure at a temperature of 200° to 280° C., thereby recovering the remaining monomer or monomers.

6. A process for producing a molded article, which comprises molding a random copolymer obtained by the process of claim 1.

7. A molded article of the random copolymer obtained according to claim 6.

8. The process according to claim 1, wherein the weight ratio between the p-divinylbenzene and the m-divinylbenzene is in the range of 100:0 to 95:5.

9. The process according to claim 1, wherein the weight ratio between the p-divinylbenzene and the m-divinylbenzene is in the range of 100:0 exclusive to 95:5 inclusive.

* * * * *